US006831561B2

(12) United States Patent
Hahn et al.

(10) Patent No.: US 6,831,561 B2
(45) Date of Patent: *Dec. 14, 2004

(54) COMMUNICATIONS SYSTEM AND METHOD WITH A/D CONVERTER

(75) Inventors: Scott Hahn, Meridian, ID (US); Mark T. Van Horn, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 695 days.

This patent is subject to a terminal disclaimer.

(21) Appl. No.: 09/765,235

(22) Filed: Jan. 16, 2001

(65) Prior Publication Data

US 2001/0001553 A1 May 24, 2001

Related U.S. Application Data

(63) Continuation of application No. 09/249,287, filed on Feb. 10, 1999, now Pat. No. 6,198,392.

(51) Int. Cl.[7] .............................................. G08B 13/14
(52) U.S. Cl. ................................ 340/572.4; 340/572.1; 340/10.1; 340/10.33; 340/825.72
(58) Field of Search ..................... 340/572.1, 825.69, 340/10.1, 10.33, 825.72, 572.4, 505, 10.34, 10.51, 10.31, 10.5; 700/290, 249; 701/2; 463/37, 38, 39; 341/176, 144

(56) References Cited

U.S. PATENT DOCUMENTS

| | | | |
|---|---|---|---|
| 5,446,447 A | | 8/1995 | Carney ....................... 340/572 |
| 5,952,922 A | * | 9/1999 | Shober ..................... 340/572.4 |
| 6,075,973 A | | 6/2000 | Greeff ........................ 455/38.2 |
| 6,137,422 A | | 10/2000 | Hahn .................... 340/825.69 |
| 6,198,392 B1 | * | 3/2001 | Hahn et al. .............. 340/572.4 |
| 6,333,690 B1 | * | 12/2001 | Nelson et al. ......... 340/539.21 |

OTHER PUBLICATIONS

Micron Communications, Inc. Data Sheets: "MicroStamp Engine SOIC", pp. 1 and 2, Feb. 20, 1998.
Linear Technology Data Sheets: LTC 1197/LTC 1197L/LTC 1199/LTC 1199L, pp. 1 and 2.
National Semiconductor Data Sheets: "MM54HC160/ MM74HC160 Synchronous Decade Counter with Asynchronous Clear . . . ", pp. 3–142 and 3–143.
Motorola, Inc. Data Sheets: "Micropower Voltage Regulator", pp. 1 and 2, 1997.
National Semiconductor Data Sheet: "MM54HC00/ MM74HC00 Quad 2–Input NAND Gate", p. 3–3.
Automatic ID News, New Active RFID System Senses Temperature, Reads from 30 Meters, Mar. 1999.
Steve MacNaull, "Identec Web Pages, High–Tech, Safe Food Delivery," Mar. 11, 1999.

* cited by examiner

Primary Examiner—Anh V. La
(74) Attorney, Agent, or Firm—Wells St. John P.S.

(57) ABSTRACT

A communications system including a radio frequency identification device including an integrated circuit having a single die including a microprocessor, a receiver coupled to the microprocessor, and a backscatter transmitter coupled to the microprocessor, the integrated circuit having a digital input, and the receiver being configured to receive wireless communications from a remote interrogator; and an analog to digital converter external of the single die and having a digital output coupled to the digital input of the integrated circuit, and having an analog input configured to be coupled to an analog measuring device, wherein the radio frequency identification device is configured to transmit a signal indicative of the analog input using the backscatter transmitter. A communications method including coupling an analog to digital converter to a radio frequency identification device.

37 Claims, 3 Drawing Sheets

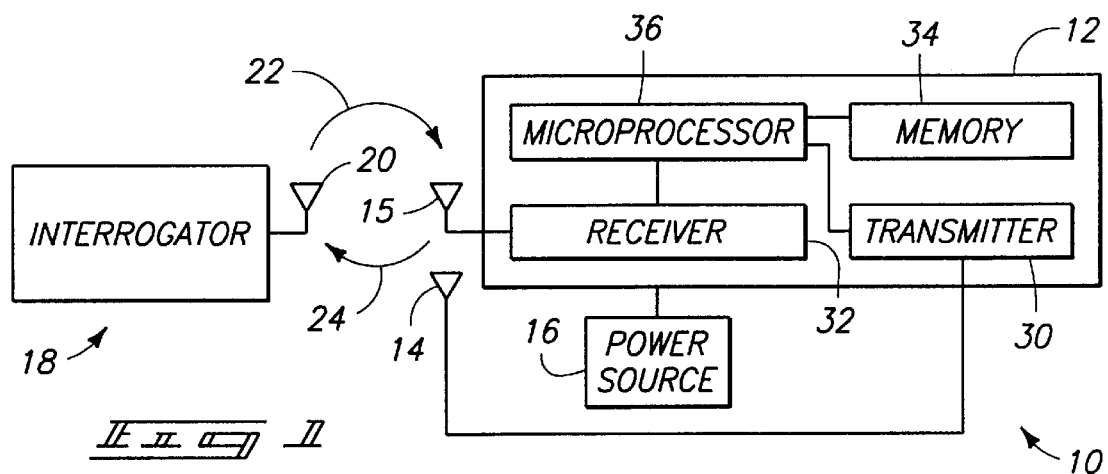
$F_{IG}$ 1
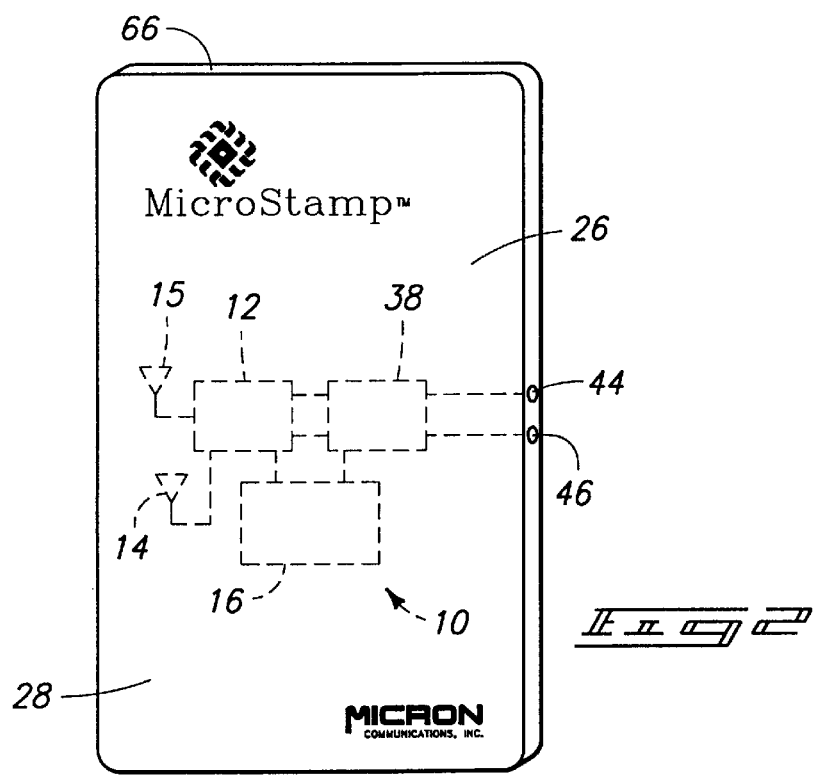
$F_{IG}$ 2
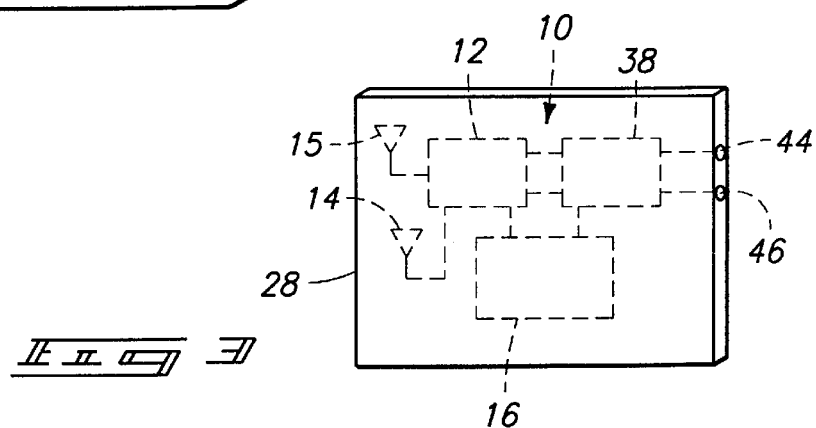
$F_{IG}$ 3

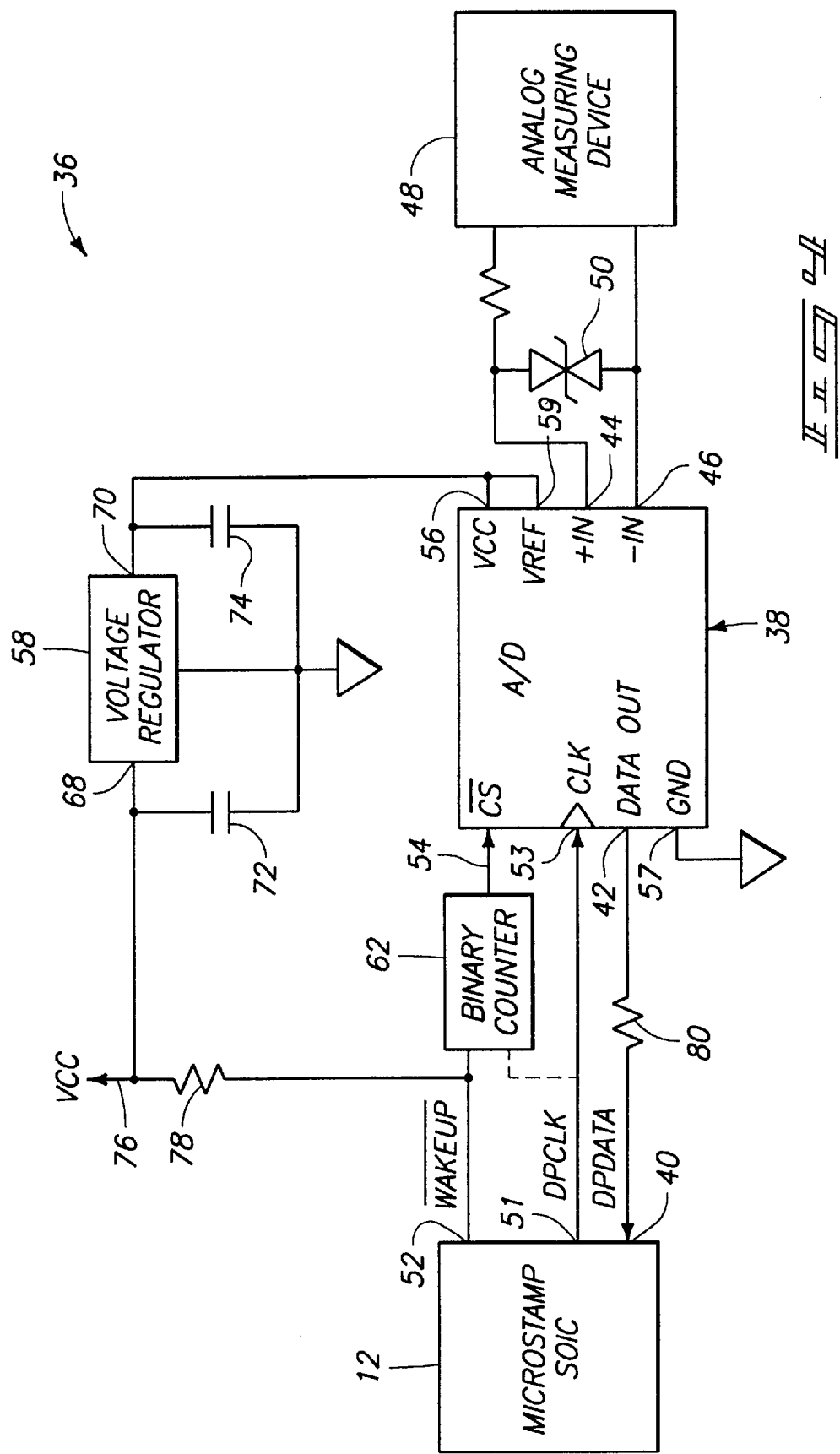

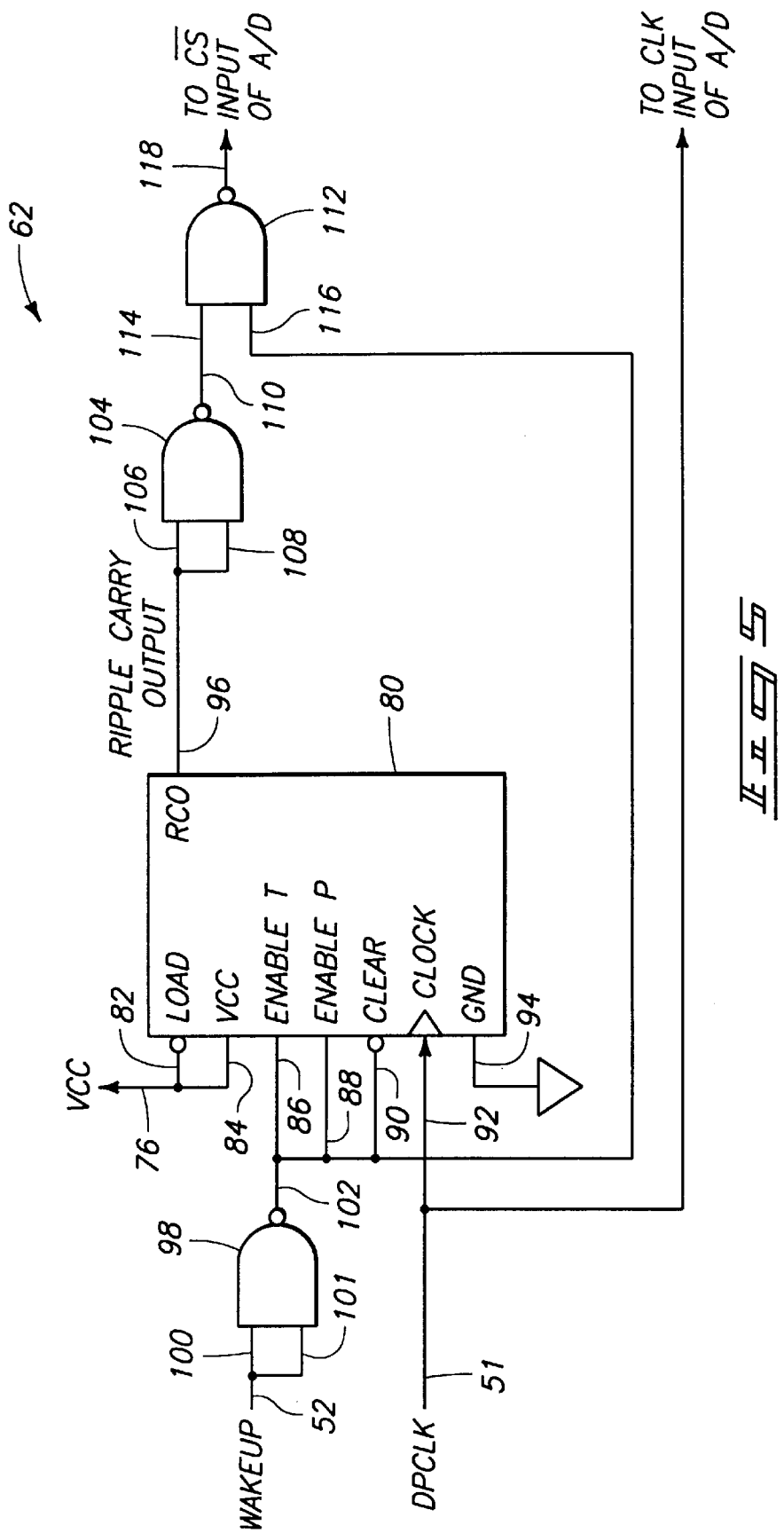

COMMUNICATIONS SYSTEM AND METHOD WITH A/D CONVERTER

CROSS REFERENCE TO RELATED APPLICATION

This is a Continuation of U.S. patent application Ser. No. 09/249,287, filed Feb. 10, 1999, now U.S. Pat. No. 6,198,392, and titled "Communications System and Method with A/D Converter".

TECHNICAL FIELD

This invention relates to systems and methods for monitoring parameters and for remote data telemetry. The invention also relates to radio frequency identification devices.

BACKGROUND OF THE INVENTION

Electronic identification devices, such as radio frequency identification devices (RFIDs), are known in the art. Such devices are typically used for inventory tracking. As large numbers of objects are moved in inventory, product manufacturing, and merchandising operations, there is a continuous challenge to accurately monitor the location and flow of objects. Additionally, there is a continuing goal to determine the location of objects in an inexpensive and streamlined manner. One way of tracking objects is with an electronic identification system.

One presently available electronic identification system utilizes a magnetic coupling system. In some cases, an identification device may be provided with a unique identification code in order to distinguish between a number of different devices. Typically, the devices are entirely passive (have no power supply), which results in a small and portable package. However, such identification systems are only capable of operation over a relatively short range, limited by the size of a magnetic field used to supply power to the devices and to communicate with the devices.

Another type of wireless electronic identification system is an active wireless electronic identification system- Attention is directed towards commonly assigned U.S. patent application Ser. No. 08/705,043, filed Aug. 29, 1996, and incorporated herein by reference, which describes such active systems in detail. One such system is sold by Micron Communications Inc., 3176 S. Denver Way, Boise, Id. 83705 under the trademark Microstamp Engine (™). These systems include integrated circuit devices which include an active transponder and are intended to be affixed to an object to be monitored. The devices are capable of receiving and processing instructions transmitted by an interrogator. A device receives the instruction, if within range, then processes the instruction and transmits a response, if appropriate. The interrogation signal and the responsive signal are typically radio-frequency (RF) signals produced by an RF transmitter circuit. Because active devices have their own power sources, and do not need to be in close proximity to an interrogator or reader to receive power via magnetic coupling. Therefore, active transponder devices tend to be more suitable for applications requiring tracking of a tagged device that may not be in close proximity to an interrogator. For example, active transponder devices tend to be more suitable for inventory control or tracking.

Because the Microstamp engine is capable of communications, it can be used for applications other than just inventory tracking and other typical RFID applications.

The Microstamp engine includes an internal A/D converter used for battery voltage sensing, but that A/D converter does not have an external input. A disadvantage of an internal A/D converter is that the user does not have the opportunity to use an A/D converter with more resolution than the internal A/D converter should the user be willing to pay extra for such resolution. Additionally, during the service life of a Microstamp engine, A/D converters may become available with higher resolution than the internal A/D converter.

SUMMARY OF THE INVENTION

The invention provides a wireless identification device configured to provide a signal to identify the device in response to an interrogation signal. In addition, the invention provides coupling an analog to digital converter to the wireless identification device.

The invention also provides a communications system comprising a radio frequency identification device including an integrated circuit. The integrated circuit has a single die including a microprocessor, a receiver coupled to the microprocessor, and a backscatter transmitter coupled to the microprocessor. The integrated circuit also has a digital input. The receiver is configured to receive wireless communications from a remote interrogator. The communications system further includes an analog to digital converter external of the single die. The analog to digital converter has a digital output coupled to the digital input of the integrated circuit, and has an analog input configured to be coupled to an analog measuring device. The radio frequency identification device is configured to transmit a signal indicative of the analog input using the backscatter transmitter.

BRIEF DESCRIPTION OF THE DRAWINGS

Preferred embodiments of the invention are described below with reference to the following accompanying drawings.

FIG. 1 is a high level circuit schematic showing an interrogator and a radio frequency identification device embodying the invention.

FIG. 2 is a front view of a housing, in the form of a badge or card, supporting the circuit of FIG. 1 according to one embodiment the invention.

FIG. 3 is a front view of a housing supporting the circuit of FIG. 1 according to another embodiment of the invention.

FIG. 4 is a circuit schematic of circuitry in accordance with one embodiment of the invention.

FIG. 5 is a circuit schematic of circuitry added to the circuitry of FIG. 4 in an alternative embodiment of the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

FIG. 1 illustrates a wireless identification device 10 in accordance with one embodiment of the invention. In the illustrated embodiment, the wireless identification device is a radio frequency data communication device 10, and includes RFID Circuitry 12. The device 10 further includes an antenna 14 connected to the circuitry 12 for wireless or radio frequency transmission by the circuitry 12 and an antenna 15 coupled to the circuitry 12 for wireless or radio frequency reception by the circuitry 12. In one embodiment, the antennas 14 and 15 are microstrip antennas. In the illustrated embodiment, the RFID circuitry 12 is defined by an integrated circuit as described in the above-incorporated patent application Ser. No. 08/705,043, filed Aug. 29, 1996. Other embodiments are possible. A power source or supply 16 is connected to the integrated circuit 12 to supply power to the integrated circuit 12. In one embodiment, the power source 16 comprises a battery.

The device 10 transmits and receives radio frequency communications to and from an interrogator 18. An exemplary interrogator is described in commonly assigned U.S. patent application Ser. No. 08/907,689, filed Aug. 8, 1997 and incorporated herein by reference. Preferably, the interrogator 18 includes an antenna 20, as well as dedicated transmitting and receiving circuitry, complementary to that implemented on the integrated circuit 12.

Generally, the interrogator 18 transmits an interrogation signal or command 22 via the antenna 20. The device 10 receives the incoming interrogation signal via antenna 15. Upon receiving the signal 22, the device 10 responds by generating and transmitting a responsive signal or reply 24 via antenna 14. The responsive signal 24 typically includes information that uniquely identifies, or labels the particular device 12 that is transmitting, so as to identify any object or person with which the device 12 is associated.

Although only one device 10 is shown in FIG. 1, typically there will be multiple devices 10 that correspond with the interrogator 18, and the particular devices 10 that are in communication with the interrogator 18 will typically change over time. In the illustrated embodiment in FIG. 1, there is no communication between multiple devices 10. Instead, the devices 10 respectively communicate with the interrogator 18. Multiple devices 10 can be used in the same field of an interrogator 18 (i.e., within communications range of an interrogator 18).

The device 10 can be included in any appropriate housing or packaging. Various methods of manufacturing housings are described in commonly assigned U.S. patent application Ser. No. 08/800,037, filed Feb. 13, 1997, and incorporated herein by reference.

FIG. 2 shows but one embodiment in the form of a card or badge 26 including a housing 28 of plastic or other suitable material supporting the device 10 and the power supply 16. In one embodiment, a face of the badge 26 has visual identification features such as graphics, text, information found on identification or credit cards, etc.

FIG. 3 illustrates but one alternative housing supporting the device 10. More particularly, FIG. 3 shows a miniature housing 28 encasing the device 10 and power supply 16 to define a tag which can be supported by an object (e.g., hung from an object, affixed to an object, etc.). Although two particular types of housings have been disclosed, other forms of housings are employed in alternative embodiments.

If the power supply 16 is a battery, the battery can take any suitable form. Preferably, the battery type will be selected depending on weight, size, and life requirements for a particular application. In one embodiment, the battery 16 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the power source 16 comprises a series connected pair of button type cells. In other alternative embodiments, other types of suitable power source are employed.

The circuitry 12 provides a responsive signal to the interrogator 18 by radio frequency. More particularly, the circuitry 12 comprises an integrated circuit including a single die having a backscatter transmitter 30, a receiver 32, a memory 34, and a microprocessor 36 coupled to the transmitter 30, receiver 32, and memory 34 (FIG. 1) as is described in U.S. patent application Ser. No. 08/705,043.

Radio frequency identification has emerged as a viable and affordable alternative to tagging or labeling small to large quantities of items. The interrogator 18 communicates with the devices 10 via an electromagnetic link, such as via an RF link (e.g., at microwave frequencies, in one embodiment), so all transmissions by the interrogator 18 are heard simultaneously by all devices 10 within range.

FIG. 4 illustrates a communications system 36 in accordance with one embodiment of the invention. The communications system 36 includes an analog to digital converter 38 coupled to the integrated circuit 12. The analog to digital converter 38 is external of the single die integrated circuit 12.

The integrated circuit 12 has a digital input 40. The analog to digital converter 38 has a digital output 42 coupled to the digital input 40 of the integrated circuit 12. The analog to digital converter 38 has first and second analog inputs 44 and 46 coupled to an analog measuring device 48 such as a temperature sensor, water level sensor, pressure sensor, or any other sensor that produces a voltage. The analog to digital converter 38 provides at its digital output 42 a signal indicative of the difference between first and second voltages applied to the first and second analog inputs 44 and 46.

The communications system 36 further comprises transient voltage protection circuitry 50 coupled between the analog inputs 44 and 46. The transient voltage protection circuitry 50 protects the analog inputs' maximum ratings from being exceeded. By using transient voltage protection circuitry 50, the effects of ESD (Electro-Static Discharge), voltage transients, and induced electrical noise (from the use of lengthy wire connections) can be reduced, and circuit performance can be enhanced.

The integrated circuit 12 further has a clock output 51, and the analog to digital converter 38 has a clock input 53 coupled to the clock output 51.

The analog to digital converter 38 further has a chip select input 54 which, when triggered, initiates an analog to digital conversion.

The integrated circuit 12 further has a wakeup output 52, coupled to the chip select input 54. A signal is produced at the wakeup output 52 to trigger the chip select input 54 in response to the receiver 32 (of FIG. 1) receiving a wireless communication. In response to the receiver 32 (of FIG. 1) receiving a read digital input command from the interrogator 18, the integrated circuit 12 (of FIG. 4) provides a signal at the wakeup output 52 and reads the digital input 40.

The analog to digital converter 38 transmits a signal indicative of the voltage differential at the analog inputs 44 and 46, using the backscatter transmitter 30 (of FIG. 1), in response to a read digital port command by the interrogator 18. More particularly, after the interrogator 18 transmits a read digital port command, the analog to digital converter initiates an analog to digital conversion of the difference in voltages at the analog inputs 44 and 46. The digital conversion is read by the integrated circuit 12 and transmitted using the backscatter transmitter 30.

The analog to digital converter 38 has a voltage supply input 56, a ground connector 57, and a reference voltage input 59. In one embodiment, the communications system 36 further comprises a voltage regulator 58 coupled to the reference voltage input 59 and to the voltage supply input 56. The voltage regulator 58 increases accuracy of the digital output by providing a stable voltage supply as well as decreased power consumption. In an alternative embodiment, the voltage regulator 58 is omitted.

In the illustrated embodiment, the integrated circuit 12 is a Microstamp Engine SOIC (™) integrated circuit, part number MSEM256X10SG available from Micron Communications, 3176 S. Denver Way, Boise, Id. 83705, and has the following pin assignments (not shown): a pin 2 defines the wakeup output 52; a pin 18 defines the clock output 51; and a pin 17 defines the digital input 40. Also, in the illustrated embodiment, the analog to digital converter 38 is an analog to digital converter integrated circuit, part number LTC1197 available from Linear Technology Corporation, and has the following pin assignments: a pin 1 defines the chip select input 54; a pin 2 defines the analog input 44; a pin 3 defines the analog input 46; a pin 4 defines the ground connector 57; a pin 5 defines the reference voltage input 59; a pin 6 defines the digital output 42; a pin 7 defines the clock input 53; and a pin 8 defines the voltage supply input 56. Other analog to digital converters can be employed. Also, in one embodiment that includes the voltage regulator 58, the voltage regulator 58 is a Micropower Voltage Regulator (™), part number MC78LC50 available from Motorola, and has the following pin assignments: a pin 1 defines a ground connector; a pin 2 defines an input 68; and a pin 3 defines an output 70 (FIG. 4). As shown in FIG. 4, a capacitor 72 is coupled between the input 68 and ground; and a capacitor 74 is coupled between the output 70 and ground. In the illustrated embodiment, the capacitors 72 and 74 respectively have values of 0.1 μF. The input 68 is coupled to a voltage supply 76 and a pull-up resistor 78 is coupled between the voltage supply 76 and the wakeup output 52. In the illustrated embodiment, the resistor 78 has a value of 100 kΩ. A resistor 80 is shown coupled between the digital output 42 and digital input 40. In the illustrated embodiment, the resistor 80 has a value of 10 kΩ. In the illustrated embodiment, the transient voltage suppressor 50 is a Transorb (™) surge suppressor.

In one embodiment, the communications system 36 further includes a binary counter 62 coupled between the wakeup output 52 and the chip select input 54. The binary counter 62 causes the integrated circuit 12 to receive from the analog to digital converter 38 multiple conversions from analog to digital per trigger signal. In an alternative embodiment, the binary counter 62 is omitted and the wakeup output 52 is coupled to the chip select input 54.

In embodiments where the binary counter 62 is employed, one circuit configuration that can be employed is shown in FIG. 5. Other alternatives are possible. The binary counter 62 shown in FIG. 5 includes an integrated circuit 80. The integrated circuit 80 includes a load input 82 and a VCC voltage supply input 84 coupled to the voltage supply 76, enable T and enable P inputs 86 and 88 (only one is used, however they are tied together so there is no pin which is floating), a clear input 90, a clock input 92 coupled to the clock output 51, a ground terminal 94 coupled to ground, and a ripple carry output 96. In the illustrated embodiment, the integrated circuit 80 is a synchronous binary counter with asynchronous clear, part number MM74HC161 available from National Semiconductor, and has the following pin assignments: a pin 1 defines the clear input 90; a pin 2 defines the clock input 92; a pin 7 defines the enable P input 88; a pin 8 defines the ground input 94; a pin 9 defines the load input 82; a pin 10 defines the enable T input 86; a pin 15 defines the ripple carry output 96, and a pin 16 defines the voltage supply input 84. Other integrated circuits could be employed.

The binary counter 62 further includes a NAND gate 98 having inputs 100 and 101 both coupled to the wakeup output 52 and having an output 102 coupled to the enable T input 86, the enable p input 88, and the clear input 90. The binary counter 62 further includes a NAND gate 104 having inputs 106 and 108 both coupled to the ripple carry output 96 and having an output 110. The binary counter 62 further includes a NAND gate 112 having an input 114 coupled to the output 110 of the NAND gate 104, having an input 116 coupled to the output 102 of the NAND gate 98, and having an output 118 coupled to the input 54 of the analog to digital converter 38. The clock output 51 is also coupled to the clock input 53 of the analog to digital converter 38 of FIG. 4 as it would be if the binary counter 62 were omitted. Also, if the binary counter 62 were omitted, the wakeup output 52 would be coupled directly to the chip select input 54 of the analog to digital converter 38. To save costs, instead of using inverters or some other variety of components, an integrated circuit having four NAND gates is used to define the NAND gates 98, 104, and 112. In the illustrated embodiment, the integrated circuit used to define the NAND gates 98, 104, and 112 is a MM74HC00 integrated circuit available from National Semiconductor.

By using the binary counter 62, thirty-two conversions from analog to digital are possible per RF command from the interrogator to read the digital port of the integrated circuit 12. Otherwise, there would only be one sample per RF command. With the thirty-two samples, averaging can be performed to obtain a more accurate reading. In the illustrated embodiment, every two bytes read by the integrated circuit 12 initiates a conversion stroke from analog to digital. With the binary counter 62, sixty-four bytes are available, resulting in thirty-two conversions.

Another aspect of the invention provides a method of manufacturing and using the communications system 36 (of FIG. 4). The method comprises supporting the monolithic semiconductor integrated circuit 12 from a substrate. The substrate can be a circuit board or other sheet capable of supporting integrated circuits thereon. In the illustrated embodiment, the substrate comprises a plastic sheet 66 that makes up a portion of the housing 28. Alternative substrates are possible (FIG. 2).

The microstrip antenna 15 (of FIG. 2) is supported from the substrate 66, external of the integrated circuit 12, and the microstrip antenna 15 is electrically coupled to the receiver 32. For example, in one embodiment, printed thick film is printed on the substrate to define the antenna 15 and intersects a pin on the integrated circuit 12 for electrical coupling to the receiver 32.

The microstrip antenna 14 is supported from the substrate 66, external of the integrated circuit 12, and the microstrip antenna 14 is electrically coupled to the transmitter 30. For example, in one embodiment, printed thick film is printed on the substrate to define the antenna 15 and intersects a pin on the integrated circuit 12 for electrical coupling to the receiver 32 as described in commonly assigned U.S. patent application Ser. No. 08/800,037, filed Feb. 13, 1997.

The battery 16 is supported from the substrate, and electrically coupled to the integrated circuit 12 to supply operating power to the integrated circuit 12.

The analog to digital converter 38 is coupled to the integrated circuit 12. In one embodiment, the analog to digital converter 38 is coupled to the integrated circuit 12, and the battery 16 is coupled to the integrated circuit substantially at the same time by mounting the analog to digital converter 38, battery 16, and integrated circuit 12 onto traces (e.g., printed thick film in one embodiment) drawn on the substrate 66 or circuit board. Assembly can take place in a manner similar to that disclosed in commonly assigned U.S. patent application Ser. No. 08/800,037, filed Feb. 13, 1997.

A digital signal indicative of the difference in magnitudes of the voltages at the analog inputs 44 and 46 is transmitted from the integrated circuit 12 to the interrogator 18 using the backscatter transmitter 30.

Thus, a communications system is provided where measurements from analog devices can be transmitted over a range longer than is possible with magnetic coupling by using an integrated circuit having a microprocessor, receiver, memory, and backscatter transmitter.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A communications system comprising:
   an integrated circuit including a processor, a receiver coupled to the processor, and a backscatter transmitter coupled to the processor, the integrated circuit having a digital input, and the receiver being configured to receive wireless communications from a remote interrogator; and
   an analog to digital converter external of the integrate circuit die and having a digital output coupled to the digital input of the integrated circuit, and having an analog input configured to be coupled to an analog measuring device, wherein the integrated circuit is configured to transmit a signal indicative of the analog input using the backscatter transmitter.

2. A communications system in accordance with claim 1 wherein the analog input is configured to receive a first voltage from the analog measuring device, wherein the analog to digital converter further has a second analog input configured to receive a second voltage, and wherein the analog to digital converter provides at its digital output a signal indicative of the difference between the first and second voltages.

3. A communications system in accordance with claim 2 and further comprising a transient voltage protector coupled between the second analog input and the first mentioned analog input.

4. A communications system comprising:
   a radio frequency identification device including an integrated circuit having a processor, a receiver coupled to the processor, a backscatter transmitter coupled to the processor, the integrated circuit having a digital input, the receiver being configured to receive wireless communications from a remote interrogator; and
   an analog to digital converter external of the integrated circuit and having a digital output coupled to the digital input of the integrated circuit, having an analog input configured to be coupled to an analog device, and having a chip select input which is configured to initiate, when triggered, an analog to digital conversion, wherein the radio frequency identification device is configured to transmit a signal indicative of the analog input using the backscatter transmitter, and wherein the integrated circuit has a wakeup output, coupled to the chip select input, at which a signal is produced configured to trigger the chip select input in response to the receiver receiving a wireless communication.

5. A communications system in accordance with claim 4 wherein, in response to the receiver receiving a read digital input command, the integrated circuit is configured to provide a signal at the wakeup output and to read the digital input.

6. A communications system in accordance with claim 4 wherein the analog to digital converter has a voltage supply input, and wherein the communications system further comprises a voltage regulator coupled to the voltage supply input.

7. A communications system comprising:
   an integrated circuit having a single die including a processor, a receiver coupled to the processor, and a backscatter transmitter coupled to the processor, the integrated circuit having a digital input, the receiver being configured to receive wireless commands from a remote interrogator;
   an analog to digital converter external of the single die an having a digital output coupled to the digital input of the integrated circuit, having an analog input configured to be coupled to an analog device, and having a chip select input which is configured to initiate, when triggered, an analog to digital conversion, wherein the radio frequency identification device is configured to transmit a digital signal indicative of the analog input using the backscatter transmitter, and wherein the integrated circuit has a wakeup output at which a trigger signal is produced configured to trigger the chip select input in response to the receiver receiving a predetermined wireless command; and
   a binary counter coupled between the wakeup output an the chip select input.

8. A communications system in accordance with claim 7 wherein the binary counter between the wakeup output and the chip select input causes the integrated circuit to receive from the analog to digital converter multiple conversions from analog to digital per trigger signal.

9. A communications system in accordance with claim 8 wherein the analog input is configured to receive a first voltage from the analog device, wherein the analog to digital converter further has a second analog input configured to receive a second voltage, and wherein the analog to digital converter provides at its digital output a signal indicative of the difference between the first and second voltages.

10. A communications system in accordance with claim 9 and further comprising a transient voltage protection circuit coupled between the second analog input and the first mentioned analog input.

11. A communications system in accordance with claim 8 wherein the analog input is configured to receive a first voltage from the analog device, wherein the analog to digital converter further has a second analog input configured to receive a second voltage, wherein the communications system further includes an analog device having first and second analog outputs respectively coupled to the first mentioned analog input and to the second analog input, and wherein the analog to digital converter provides at it digital output a signal indicative of the difference between the first and second voltages.

12. A communications system in accordance with claim 7 and further comprising an analog measuring device couple to the analog input.

13. A communications system for use with a remote interrogator, the system comprising:
- a wireless communication device including:
  - a substrate;
  - a semiconductor integrated circuit, supported by the substrate, including a processor, a receiver coupled to the processor, and a backscatter transmitter coupled to the processor, and a digital input coupled to the processor, the transmitter being configured to transmit in response to the receiver receiving a carrier signal from an interrogator; and
  - a power source electrically coupled to the integrated circuit and configured to generate operating power for the communications device; and
- an analog to digital converter external of the integrated circuit and having a digital output coupled to the digital input of the integrated circuit, having an analog input configured to be coupled to an analog voltage, and having a chip select input configured to initiate an analog to digital conversion when triggered, wherein the integrated circuit is configured to transmit a digital signal indicative of the analog input using the backscatter transmitter.

14. A communications system in accordance with claim 13 wherein the integrated circuit has a wakeup output, coupled to the chip select input, at which a trigger signal is produced configured to trigger the chip select input in response to the receiver receiving a wireless communication.

15. A communications system in accordance with claim 14 and further comprising a binary counter coupled between the wakeup output and the chip select input.

16. A communications system in accordance with claim 15 wherein coupling the binary counter between the wakeup output and the chip select input results in the integrated circuit receiving, from the analog to digital converter, multiple conversions from analog to digital per trigger signal.

17. A communications system in accordance with claim 16 wherein the analog input is configured to receive a first voltage from an analog measuring device, wherein the analog to digital converter further has a second analog input configured to receive a second voltage, and wherein the analog to digital converter provides at its digital output a signal indicative of the difference between the first and second voltages.

18. A communications system in accordance with claim 17 and further comprising transient voltage protection circuitry coupled between the second analog input and the first mentioned analog input.

19. A communications method comprising:
- coupling an analog to digital converter to an integrated circuit having a processor, a receiver coupled to the processor, and a backscatter transmitter coupled to the processor, the integrated circuit having a digital input, and the receiver being configured to receive wireless communication from a remote interrogator, the analog to digital converter having a digital output and having an analog input configured to be coupled to an analog measuring device, the coupling of the analog to digital converter to the integrated circuit comprising coupling the digital output of the analog to digital converter to the digital input of the integrated circuit.

20. A communications method in accordance with claim 19 wherein the analog to digital converter further has a second analog input, and wherein the method further comprises providing, at the digital output of the analog to digital converter, a signal indicative of the difference between voltages applied to the second and first mentioned analog inputs.

21. A communications method in accordance with claim 20 and further comprising providing protection against transient voltages, between the second analog input and the first mentioned analog input.

22. A communications method comprising:
- coupling an analog to digital converter to a radio frequency identification device of a type including an integrated circuit having a processor, a receiver coupled to the processor, and a backscatter transmitter coupled to the processor, the integrated circuit having a digital input, and having a wakeup output at which a signal is produced in response to the receiver receiving a wireless communication, and the receiver being configured to receive wireless communications from a remote interrogator, the analog to digital converter having a digital output, having an analog input configured to be coupled to an analog device, and having a chip select input which is configured to initiate, when triggered, an analog to digital conversion, the coupling of the analog to digital converter to the radio frequency identification device comprising coupling the digital output of the analog to digital converter to the digital input of the integrated circuit and coupling the chip select input to the wakeup output.

23. A communications method in accordance with claim 22 and further comprising providing, with the integrated circuit a signal at the wakeup output, and reading, with the integrated circuit, the digital input, in response to the receiver receiving a read digital input command.

24. A communications method in accordance with claim 22 wherein the analog to digital converter has a voltage supply input, and wherein the communications method further comprises coupling a voltage regulator to the voltage supply input.

25. A communications method comprising:
- coupling an analog to digital converter to an integrated circuit having a single die including a processor, a receiver coupled to the processor, and a backscatter transmitter coupled to the processor, the integrated circuit having a digital input, and having a wakeup output at which a signal is produced in response to the receiver receiving a wireless communication, and the receiver being configured to receive wireless communications from a remote interrogator, the analog to digital converter having a digital output, having an analog input configured to be coupled to an analog device, and having a chip select input which is configured to initiate, when triggered, an analog to digital conversion, the coupling of the analog to digital converter to the integrated circuit comprising coupling the digital output of the analog to digital converter to the digital input of the integrated circuit and coupling the chip select input to the wakeup output; and
- causing the integrated circuit to receive, from the analog to digital converter, multiple conversions from analog to digital per trigger signal.

26. A communications method in accordance with claim 25 wherein causing the integrated circuit to receive, from the analog to digital converter, multiple conversions from analog to digital per trigger signal comprises coupling a binary counter between the wakeup output and the chip select input.

27. A communications method in accordance with claim 26 wherein the analog to digital converter further has a second analog input, the method further comprising providing, at the digital output of the analog to digital converter, a signal indicative of the difference between voltage applied to the first and second analog inputs.

28. A communications method in accordance with claim 27 and further comprising protecting against transient voltages between the second analog input and the first mentioned analog input.

29. A communications method in accordance with claim 25 wherein the analog input is configured to receive a first voltage from the analog measuring device, wherein the analog to digital converter further has a second analog input, wherein the communications method further includes respectively coupling first and second analog outputs of an analog device to the first mentioned analog input and to the second analog input, and providing, with the analog to digital converter, at its digital output, a signal indicative of the difference between the first and second voltages.

30. A communications method in accordance with claim 25 and further comprising coupling an analog measuring device to the analog input.

31. A method of manufacturing and using a communications system with a remote interrogator unit, the method comprising:

supporting a semiconductor integrated circuit from substrate, the integrated circuit including a processor, a receiver coupled to the processor, a backscatter transmitter coupled to the processor, a wakeup output configured to produce a trigger signal in response to the receiver receiving a wireless communication, and a digital input coupled to the processor, the transmitter being configured to transmit in response to the receiver receiving a carrier signal from an interrogator; and electrically coupling a power source to the integrated circuit to supply operating power to the integrated circuit; and coupling an analog to digital converter to the integrated circuit, the analog to digital converter having a digital output, having an analog input configured to be coupled to an analog voltage, and having a chip select input which, when triggered, initiates an analog to digital conversion, the coupling of the analog to digital converter to the integrated circuit comprising coupling the digital output to the digital input.

32. A method in accordance with claim 31 and further comprising coupling the wakeup output to the chip select input; and transmitting a digital signal indicative of the analog input using the backscatter transmitter.

33. A method in accordance with claim 32 and further comprising coupling a binary counter between the wakeup output and the chip select input.

34. A method in accordance with claim 33 wherein coupling the binary counter between the wakeup output and the chip select input results in the integrated circuit receiving, from the analog to digital converter, multiple conversions from analog to digital per trigger signal.

35. A method in accordance with claim 34 wherein the analog input is configured to receive a first voltage from an analog measuring device, wherein the analog to digital converter further has a second analog input configured to receive a second voltage, and wherein the analog to digital converter provides at its digital output a signal indicative the difference between the first and second voltages.

36. A method in accordance with claim 35 and further comprising a transient voltage protection circuit coupled between the second analog input and the first mentioned analog input.

37. A method comprising:

measuring a parameter with a transducer to produce a signal indicative of the magnitude of the parameter;

converting the signal to a digital value;

reading the digital value with a digital input of a wireless communications device having an integrated circuit including a processor, a receiver coupled to the processor, a backscatter transmitter coupled to the processor, the transmitter being configured to transmit in response to the receiver receiving a carrier signal from an interrogator; and transmitting the digital value to a remote interrogator using the backscatter transmitter by modulating onto a carrier transmitted by the interrogator.

* * * * *

UNITED STATES PATENT AND TRADEMARK OFFICE
CERTIFICATE OF CORRECTION

PATENT NO. : 6,831,561 B2  Page 1 of 1
DATED : December 14, 2004
INVENTOR(S) : Hahn et al.

It is certified that error appears in the above-identified patent and that said Letters Patent is hereby corrected as shown below:

Column 1,
Line 67, please delete "AID" after "that" and insert -- A/D --.

Column 2,
Line 42, please insert -- of -- after "embodiment".

Column 6,
Line 4, please delete "p" after "enable" and insert -- P --.

Column 7,
Line 34, please delete "integrate" and "the" and insert -- integrated --.

Column 8,
Lines 23 and 36, please delete "an" after "die" and insert -- and --.
Line 62, please delete "it" after "at" and insert -- its --.
Line 66, please delete "couple" after "device" and insert -- coupled --.

Signed and Sealed this

Fifteenth Day of November, 2005

JON W. DUDAS
*Director of the United States Patent and Trademark Office*